United States Patent Office 3,318,175
Patented May 9, 1967

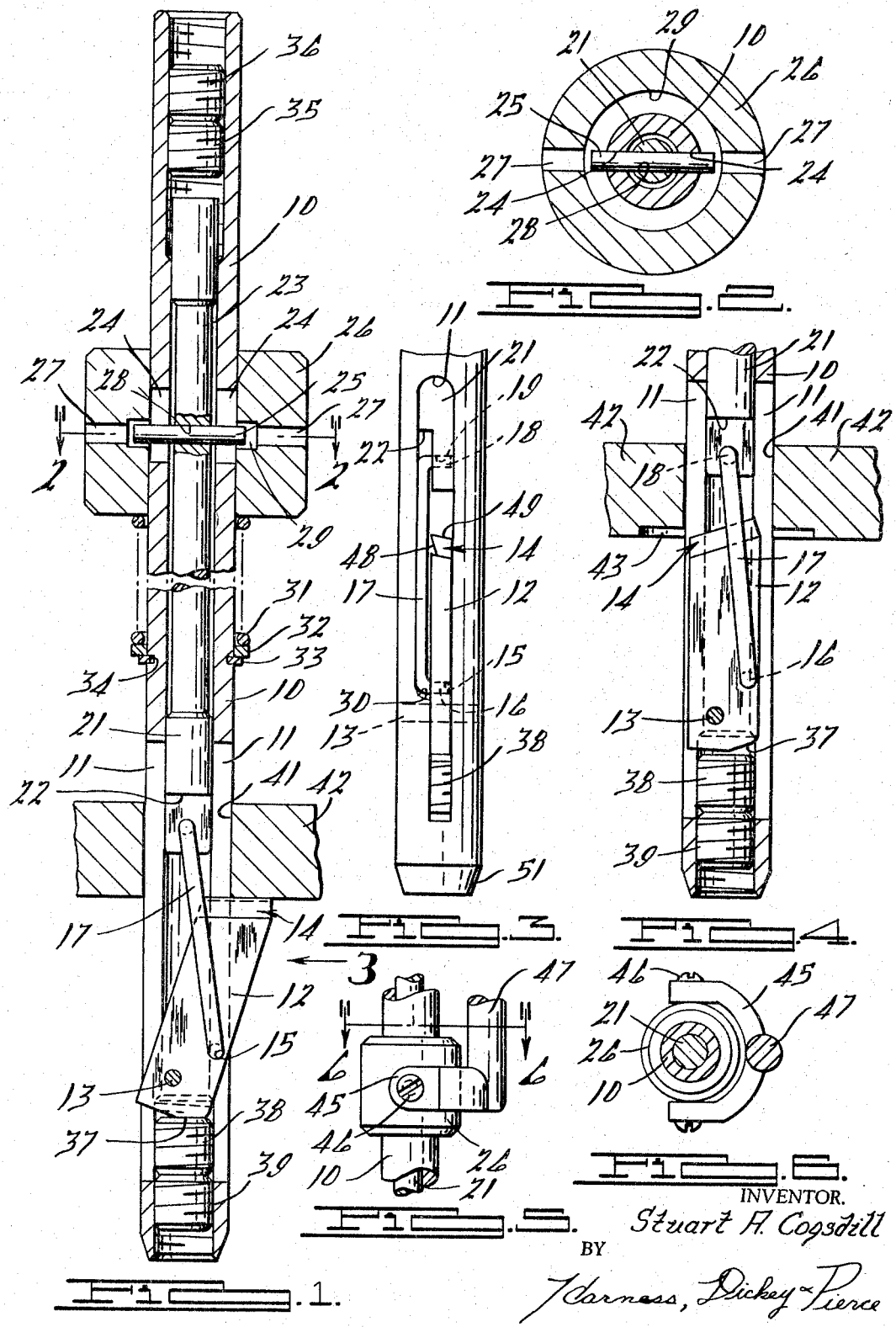

3,318,175
CUTTING TOOL
Stuart A. Cogsdill, Orchard Lake, Mich., assignor to Cogsdill Tool Products, Inc., Detroit, Mich., a corporation of Michigan
Filed July 7, 1965, Ser. No. 470,006
11 Claims. (Cl. 77—73.5)

This invention relates to cutting tools, particularly to a cutting tool of the back-facing type.

Difficulty has always been experienced to machine a recess about an opening on the inner or bottom side of a workpiece which is substantially inaccessible. This is especially true in automatic machines where machine operations are performed seriatim and in many instances without the aid of a mechanic.

The present invention pertains to a back-facing tool having a blade which is extended after it passes the bottom of the aperture in position to machine the surface thereabout. A sleeve on the tool body is actuated either manually or automatically to move a rod within the body which moves a link connected to the blade to swing the latter outwardly and secure it in extended position. Upon the reverse movement of the tool in the aperture the blade will engage the work while the tool is rotated and machine a recess about the aperture to a desired depth. After the recess is machined in this manner, the downward movement of the tool in the aperture moves the blade from the recess cut thereby, upon upward movement of the sleeve, either manually or automatically, and the blade will be returned to its retracted position within the tool body so that the tool may be withdrawn from the aperture.

Accordingly, the main objects of the invention are: to provide a hollow tool body containing a through slot in which a blade is pivoted and from which it is moved outwardly into locked position after being inserted through an aperture in a workpiece to be machined; to provide a back-facing tool having a hollow cylindrical body containing a slot in which a blade with an upwardly disposed cutting end is pivotally connected by a link with a reciprocal rod within the body which moves the blade outwardly and secures it in outward cutting position; to provide a back-facing tool having a pivoted blade connected with a link to an actuating rod which moves the blade to cutting and retracted positions; and in general to provide a back-facing tool which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

FIGURE 1 is a broken sectional view of a back-facing tool disposed in cutting position with the work and embodying features of the present invention;

FIG. 2 is an enlarged sectional view of the structure illustrated in FIG. 1 taken on the line 2—2 thereof;

FIG. 3 is a broken view in elevation of the structure illustrated in FIG. 1, with the blade in retracted position;

FIG. 4 is a sectional view of the structure illustrated in FIG. 3, taken on the line 4—4 thereof;

FIG. 5 is a broken view of structure, similar to that illustrated in FIG. 1, showing a further form of the invention, and FIG. 6 is a sectional view of the structure illustrated in FIG. 5 taken on the line 6—6 thereof.

The back-facing tool of the present invention comprises a hollow cylindrical body 10 having a diametrical slot 11 cut therein and extending through the walls of the body.

A blade 12 is secured by a pivot 13 within the slot of the body with the pin disposed in rearward offset relation to the body axis. The blade has a cutting end 14, which is disposed horizontally when the blade is in outwardly extending cutting position as illustrated in FIG. 1. The cutting blade 12 has a second aperture 15 therein in which an end 16 of a link 17 extends. The opposite end 18 of the link extends into an aperture 19 in a rod 21 having a shoulder 22 machined on the end providing clearance for the reception of the link 17. The central portion 23 of the rod is reduced in diameter to be out of engagement with the inner wall of the tool body 10.

The body has two diametrically disposed slots 24 through which the ends of a pin 25 project when extending through an aperture 28 in the rod 21. A sleeve 26 has diametrically disposed apertures 27 through one of which the pin 25 is moved when inserted in the aperture 28 in the rod 21. The ends of the pin 25 extend within an annular groove 29 in the inner wall of the sleeve 26 to secure the sleeve on the pin ends. The sleeve moves the pin along the slots 24 to advance and retract the rod 21 and therefore the cutting blade 12. The sleeve 26 is urged upwardly by a spring 31 engaging the bottom face of the sleeve with the opposite end of the spring engaging a washer 32 positioned about the body 10 and prevented from moving downwardly by a snap ring 33 which extends within a slot 34 in the outer body wall.

It will be noted that the end 16 of the link 17 is always maintained forwardly of the blade pivot 13 so as to be in position to urge the blade 12 outwardly and to prevent the blade from passing outwardly of the rearward slot 11 when in retracted position. This is accomplished by stopping the upward movement of the rod 21 when abutting against a set screw 35 threaded in the top end of the body 10 which is locked in adjusted position by a second set screw 36. The set screws are so adjusted that when the upper end of the rod 21 strikes the set screw 35, the blade 12 will be entirely retracted within the body 10, as illustrated in FIG. 4. The bottom edge of the blade has a sloping position 37 which is parallel to the cutting end 14 and which forms a stop for securing the cutting edge in proper extended position. A set screw 38 threaded in the bottom end of the body is adjusted to abut the sloping face when the blade 12 is in an extended cutting position, as illustrated in FIG. 1. This limits the outward movement of the blade and locates the cutting edge in a desired horizontal position. After the set screw 38 is adjusted, it is retained in adjusted position by a second set screw 39.

In operation, the upper end of the tool body 10 is secured in a driving spindle and rotated at a predetermined speed. The spindle is lowered to pass the end of the bottom tool through an aperture 41 in a workpiece 42 in position to have the blade 12 disposed therebelow. The sleeve 26 is then moved downwardly to tilt the blade 12 outwardly of the body into cutting position when the sloping surface 37 abuts the end of the set screw 38. The sleeve is held in this position until the spindle is moved upwardly to have the cutting edge 14 engage the workpiece 42. The continuous upward pull causes the blade to cut a circular recess 43 in the underside thereof of the workpiece concentric to the aperture 41. After the depth of the recess 43 is reached, the spindle is moved downwardly to clear the cutting end of this blade from the workpiece and the spring 31 moves the sleeve 32 upwardly to retract the rod 21 and the link 17 which swings the blade counterclockwise. When the upper end of the rod 21 strikes the set screw 35, the blade 12 is accurately located within the body 10 as clearly illustrated in FIG. 4. Thereafter, the tool is moved upwardly out of the aperture 41 and from the workpiece 42.

The lower walls of the slot 11 embrace the sides of the blade 12 at and below the pivot 13. Above the pivot 13 the slot is widened at 30 to provide clearance for the link 17 at the side of the upper portion of the blade 12. The cutting edge 14 is notched on its forward face at 48 and is relieved rearwardly at 49 to provide a sharp relieved cutting edge which is to be advanced into the work. The bottom end of the tool body 10 is tapered at 51 for guiding the tool body into the aperture 41.

The above operation requires the manual movement and retension of the sleeve 26 and when it is desired to have the sleeve operate automatically, a clevis 45 is secured to the sleeve 26 by screws 46 threaded into the end of the apertures 27. These are the apertures through one of which the pin 25 was passed when being inserted through the slots 24 of the body and the aperture 28 in the rod 21. The clevis 45 has an extending arm 47 in firm fixed relation thereto, which is engaged by an actuating member (not shown) of a machine for moving the arm 47 upwardly and downwardly and therefore the clevis 45 and the sleeve 26 therewith. With this arrangements, after the tool has been inserted in the aperture 41 of the workpiece with the blade positioned below the underside thereof, the arm 47 and clevis 45 move downwardly carrying the sleeve 26 downwardly therewith along with the rod 21 and link 17 which moves the blade into cutting position. After the back-facing operation has been performed, the tool is moved downwardly to move the blade 12 from the bottom of the workpiece and the arm 47 is moved upwardly along with the clevis 45 and sleeve 26 to thereby move the rod 21 and link 17 upwardly to return the blade to nested position within the body 10 of the tool, thereby permitting the retraction of the tool from the aperture 41. With such an arrangement, the tool can be employed on a completely automatic machine or series of machines on which various work operations are performed without requiring a mechanic to manipulate any part of the tools while producing the machining operations.

What is claimed is:

1. In a back-facing tool, a cylindrical body having a diametrically disposed slot, a blade having a sloping cutting edge at one end and a sloping section at the other end which is parallel to the cutting edge, a pivot securing said blade in the bottom of said slot passing through the blade and the body rearwardly of the center thereof, a rod within the body above the blade, a pin within the slot extending through said rod with the ends extending beyond said body, a link pivoted to the rod and to the blade at a point forwardly of the center of the body, means for moving the rod and link in reciprocation for moving the blade outwardly into cutting position when moved in one direction and for retracting the blade within the body when moved in the opposite direction, and means for engaging the end of the blade opposite to that having the cutting edge when the blade is in cutting position.

2. In a back-facing tool, a cylindrical body having a diametrically disposed slot, a blade having a sloping cutting edge at one end and a sloping section at the other end which is parallel to the cutting edge, a pivot securing said blade in the bottom of said slot passing through the blade and the body rearwardly of the center thereof, a rod within the body above the blade, a pin within the slot extending through said rod with the ends extending beyond said body, a link pivoted to the rod and to the blade at a point forwardly of the center of the body, a spring carried by the body for urging the pin and rod upwardly for returning the blade to its retracted position within the body when the tool is moved downwardly after the cutting operation to release the blade from the workpiece, and adjustable means for limiting the upward movement of the rod within the body.

3. In a back-facing tool, a cylindrical body having a first diametrically disposed slot and a second diametrically disposed slot above said first slot, a blade having a sloping cutting edge at one end and a sloping section at the other end which is parallel to the cutting edge, a pivot securing said blade in said first slot passing through the blade; and the body rearwardly of the center thereof, a rod within the body above the blade, a pin extending through said rod and the second slot with the ends extending beyond said body, a link connecting the rod to the blade at a point forwardly of the center of the body, means for moving the rod and link in reciprocation for moving the blade outwardly into cutting position when moved in one direction and for retracting the blade when moved in the opposite direction, a spring carried by the body for urging the pin and rod upwardly for returning the blade to its retracted position within the body when the tool is moved downwardly after the cutting operation to release the blade from the workpiece, and adjustable means for limiting the upward travel of the rod within the body.

4. In a back-facing tool, a cylindrical body having a first diametrically disposed slot and a second diametrically disposed slot above said first slot, a blade having a sloping cutting edge at one end and a sloping section at the other end which is parallel to the cutting edge, a pivot securing said blade in said first slot passing through the blade and the body rearwardly of the center thereof, a rod within the body above the blade, a pin extending through said rod and the second slot with the ends extending beyond said body, a link connecting the rod to the blade at a point forwardly of the center of the body, means for moving the rod and link in reciprocation for moving the blade outwardly into cutting position when moved in one direction and for retracting the blade when moved in the opposite direction, a spring carried by the body for urging the pin and rod upwardly for returning the blade to its retracted position within the body when the tool is moved downwardly after the cutting operation to release the blade from the workpiece, adjustable means for limiting upward travel of the rod within the body, and an adjustable means at the bottom of the body for engaging the sloping section of the blade for locating the cutting edge in horizontal position.

5. In a back-facing tool, a cylindrical body having a diametrically disposed slot, a blade having a sloping cutting edge at one end and a sloping section at the other end which is parallel to the cutting edge, a pivot securing said blade in the bottom of said slot passing through the blade and the body rearwardly of the center thereof, a rod within the body above the blade, a pin within the slot extending through said rod with the ends extending beyond said body, a link pivoted to the rod and to the blade at a point forwardly of the center of the body, means for moving the rod and link in reciprocation for moving the blade outwardly into cutting position when moved in one direction and for retracting the blade when moved in the opposite direction, a sleeve about the body having an annular recess into which the ends of the pin extends and by which the rod is adjusted, and means engaging the end of the blade opposite to that having the cutting edge when the blade is in cutting position.

6. In a back-facing tool, a cylindrical body having a diametrically disposed slot, a blade having a sloping cutting edge at one end and a sloping section at the other end which is parallel to the cutting edge, a pivot securing said blade in the bottom of said slot passing through the blade and the body rearwardly of the center thereof, a rod within the body above the blade, a pin within the slot extending through said rod with the ends extending beyond said body, a link pivoted to the rod and to the blade at a point forwardly of the center of the body, means for moving the rod and link in reciprocation for moving the blade outwardly into cutting position when moved in one direction and for retracting the blade when moved in the opposite direction, a sleeve about the body having an annular recess into which the ends of the pin extends and by which the rod is adjusted, a spring about the body in engagement with the lower face of the sleeve for urging the sleeve, pin and rod upwardly within the body, and means engaging the end of the blade opposite to that having the cutting edge when the blade is in cutting position.

7. In a back-facing tool, a cylindrical body having a diametrically disposed slot, a blade having a sloping cutting edge at one end and a sloping section at the other end which is parallel to the cutting edge, a pivot securing said blade in the bottom of said slot passing through the blade and the body rearwardly of the center thereof, a rod within the body above the blade, a pin within the slot extending through said rod with the ends extending beyond said body, a link pivoted to the rod and to the blade at a point forwardly of the center of the body, means for moving the rod and link in reciprocation for moving the blade outwardly into cutting position when moved in one direction and for retracting the blade when moved in the opposite direction, a sleeve about the body having an annular recess into which the ends of the pin extends and by which the rod is adjusted, means secured to said sleeve by which it is adjusted along the body, and means engaging the end of the blade opposite to that having the cutting edge when the blade is in cutting position.

8. In a back-facing tool, a hollow cylindrical body having a diametrical slot, a blade having substantially parallel sides and a cutting edge at one end disposed diagonally relative to said sides, a pivot securing said blade in said first slot passing through the blade and slot to one side of the body center, a rod within the body above the blade, a pin within said slot extending through said rod with the ends extending beyond said body, a link connecting the rod to the blade at a point on the opposite side of the body center from that from which the pivot is offset, a sleeve movable on said body having an annular recess into which the ends of said pin extend, and adjustable supporting means engageable with the end of the blade opposite to that having the cutting end for directly taking the cutting force.

9. In a back-facing tool, a hollow cylindrical body having a diametrical slot, a blade having substantially parallel sides and a cutting edge at one end disposed diagonally relative to said sides, a pivot securing said blade in said first slot passing through the blade and slot to one side of the body center, a rod within the body above the blade, a pin within said slot extending through said rod with the ends extending beyond said body, a link connecting the rod to the blade at a point on the opposite side of the body center from that from which the pivot is offset, a sleeve movable on said body having an annular recess into which the ends of said pin extend, a spring on said body beneath said sleeve against which it is retained by an element supported by the body, and adjustable supporting means engageable with the end of the blade opposite to that having the cutting end for directly taking the cutting force.

10. In a back-facing tool, a hollow cylindrical body having a first diametrical slot and a second diametrical slot disposed thereabove, a blade having substantially parallel sides and a cutting edge at one end disposed diagonally relative to said sides, a pivot securing said blade in said first slot passing through the blade and slot to one side of the body center, a rod within the body above the blade, a pin extending through said rod through said second slot with the ends extending beyond said body, a link connecting the rod to the blade at a point on the opposite side of the body center from that from which the pivot is offset, a sleeve slidable on said body having an annular recess into which the ends of said pin extend, and a screw threaded in the end of the body above the rod for limiting its upward movement at a point which positions the blade within the body.

11. In a back-facing tool, a hollow cylindrical body having a diametrical slot, a blade having substantially parallel sides and a cutting edge at one end disposed diagonally relative to said sides, a pivot securing said blade in said first slot passing through the blade and slot to one side of the body center, a rod within the body above the blade, a pin within said slot extending through said rod with the ends extending beyond said body, a link connecting the rod to the blade at a point on the opposite side of the body center from that from which the pivot is offset, a sleeve movable on said body having an annular recess into which the ends of said pin extend, and a screw within the body engageable by the end of the blade opposite to that having the cutting end for backing up the blade during the cutting operation.

References Cited by the Examiner

UNITED STATES PATENTS

| | | |
|---|---|---|
| 963,725 | 7/1910 | Sellers. |
| 2,314,084 | 3/1943 | Fried _____ 77—73.5 |
| 3,019,712 | 2/1962 | Winberry _____ 90—11 |

WILLIAM W. DYER, Jr., *Primary Examiner.*

GERALD A. DOST, *Examiner.*